April 22, 1969     D. E. SWARTZ     3,440,515

SHUNT REGULATOR BATTERY CHARGER

Filed April 12, 1968

INVENTOR.
DONALD E. SWARTZ
BY
ATTORNEY

United States Patent Office 3,440,515
Patented Apr. 22, 1969

3,440,515
SHUNT REGULATOR BATTERY CHARGER
Donald E. Swartz, Berea, Ohio, assignor to Union Carbide
Corporation, a corporation of New York
Continuation-in-part of application Ser. No. 465,102,
June 18, 1965. This application Apr. 12, 1968, Ser.
No. 733,201
Int. Cl. H02j 7/00, 7/04
U.S. Cl. 320—24    3 Claims

ABSTRACT OF THE DISCLOSURE

A battery charger for charging a battery from a substantially unidirectional voltage source comprising a voltage attenuating means connected in series with the voltage source and the battery, and a shunt regulating circuit including a transistor having its emitter-collector path connected across the terminals of the battery, resistance means having an adjustable tap connected across the emitter-collector path of the transistor and across the battery and at least one semi-conductor diode connected in series between the adjustable tap and the base of the transistor, the diode being chosen to have a threshold voltage such that it will conduct current at the lowest voltage level applied across the shunt regulating circuit when the battery is in the fully discharged condition.

---

This application is a continuation-in-part of my earlier application Ser. No. 465,102, filed on June 18, 1965, now abandoned.

This invention relates to battery chargers, and more particularly to novel and improved circuit arrangements for charging a secondary or rechargeable battery characterized in that its on-charge voltage rises until the battery reaches the fully charged condition. Illustrative battery systems of this character include alkaline zinc-manganese dioxide, lead acid and cadmium-silver oxide batteries.

A battery of the above-indicated character is generally charged by means of a charger that contains control means for limiting the total amount of charge capacity returned to the battery. Battery chargers of this type derive charge current from an input voltage source, a rectifier, and a series resistor. The input voltage in this type of circuit is necessarily higher than the voltage of the battery when it is fully charged. In practice, the charging current decreases from a maximum value, which occurs when the battery is fully discharged, to a minimum value as the battery approaches the fully charged condition.

A major problem encountered in the use of this type of tapered current charger is that the value of the series resistor must continually be altered in order that the most advantageous charging current will be supplied in a minimum time. A fixed resistance value will result in either too much current at one point in the charging cycle or will result in an extremely slow charging rate.

Another problem which often arises in a conventional current tapered battery charger is that charging current varies with fluctuations in the A.C. line voltage. Unfortunately, these variations in charging current cannot be controlled and when they occur it is difficult or impossible to ascertain the amount of charge delivered to the battery during the charge period.

It is a general object of this invention to provide an improved battery charger of the tapered current type.

A more specific object of this invention is to provide an improved battery charger which is capable of providing a tapered charging current to the battery under charge which battery charger is substantially insensitive to ordinary A.C. line voltage fluctuations.

It is another object of this invention to provide an improved battery charger which is simple, inexpensive and compact.

It is still another object of this invention to provide an improved battery charger wherein the charging current is sufficiently controlled such that it is capable of restoring rapidly the required amount of energy necessary to bring the battery to a condition of full charge without excessive overcharge.

Figure 1:
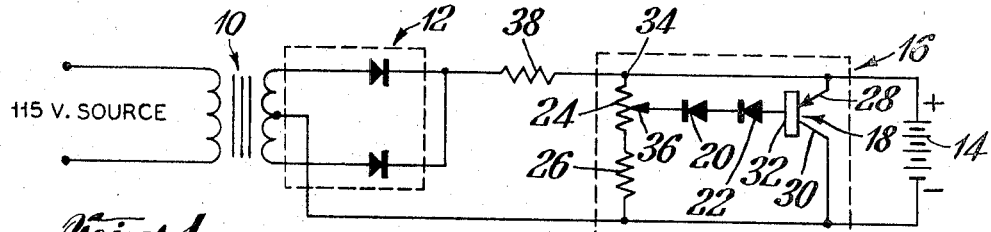
Figure 2:
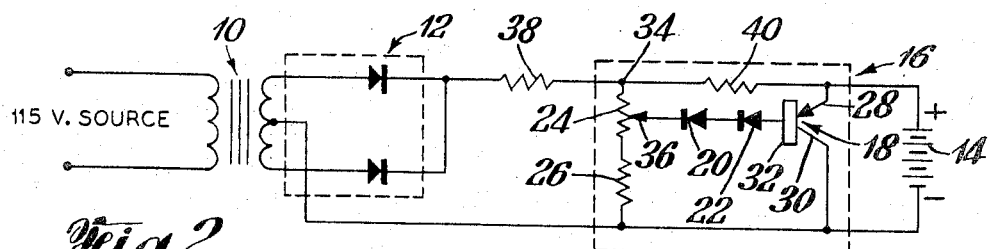
Figure 3:
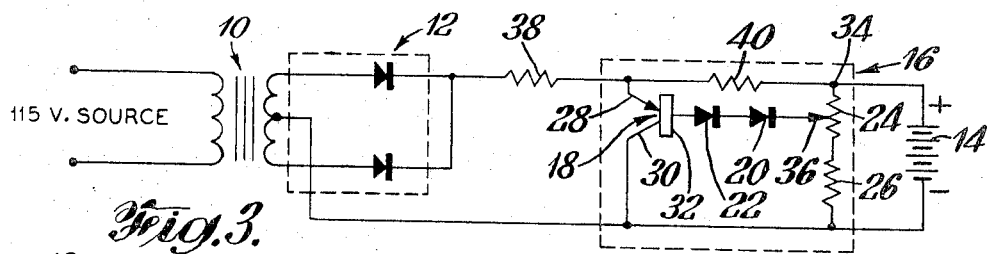
Figure 4:
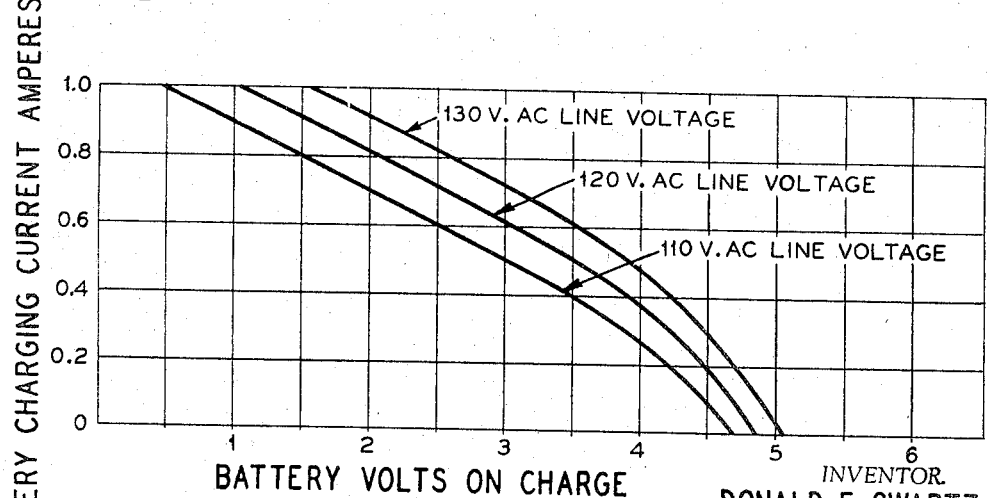

Other objects and advantages of the invention will become apparent from the following description, taken in conjunction with the accompanying drawing, wherein:

FIGURE 1 is a circuit diagram illustrating one embodiment of the battery charger of the invention;
FIGURE 2 is a circuit diagram illustrating another embodiment of the invention;
FIGURE 3 is a circuit diagram illustrating still another embodiment of the invention; and
FIGURE 4 is a graph illustrating the performance of the battery charger of FIGURE 2.

In accordance with the invention there is provided a battery charger comprising an active current controlling means and a shunt regulating circuit which cooperate to provide a tapered current to the terminals of the battery under charge and which enable the battery to charge up to a voltage which is not significantly affected by ordinary line voltage variations. The shunt regulating circuit consists of a transistor for regulating the charging current having the emitter-collector path connected across the battery, a voltage reference diode cooperating with the transistor, and voltage divider networks for supplying proper voltages to the regulating components. The voltage reference diode may be a simple semi-conductor diode and is connected in series with the base of the transistor. The reference diode is chosen to have a threshold voltage such that it will continuously conduct a varying current from the beginning to end of the charge period.

In operation, a charging current flows directly from a D.C. voltage source to the battery under charge, bypassing the shunting circuit when the battery is discharged and battery voltage is low. As the voltage of the battery increases, the transistor of the shunt regulating circuit becomes properly biased to conduct more current due to flow of current through reference diode, thereby providing a parallel current path and reducing the current to the battery. As the battery voltage continues to increase, the charging current is further reduced since the voltages within the shunt regulating circuit are so altered as to further increase the current flow through the transistor. Therefore, as the battery voltage increases, the charging current decreases toward an equilibrium (minimum) value depending on the condition and behavior of the battery as it approaches a maximum state of charge consistent with the charger character, age of the battery and the battery chemical system.

Referring now to the drawing, the battery charger of the invention may be supplied with direct current derived, for example, by rectification from a convenient source of alternating current, such as a 120 volt A.C. source, through a transformer 10 having its primary connected across the alternating current source and its secondary connected across a full-wave rectifier generally indicated by the reference numeral 12. Although only one embodiment of a full-wave rectifier is illustrated in the drawing, it will be appreciated that numerous constructions may be employed to obtain full-wave or half-wave rectification. In addition, the rectified signal may be filtered by a wide variety of means such as by placing a suitable filter or smoothing network across the rectifier portion of the circuit. It may be generally stated that the battery charger of the invention will operate successfully if it is provided with a substantially unidirectional current, whether it is filtered or unfiltered, half-wave, full-wave or pure direct current.

Referring now to FIGURE 1, the battery to be charged 14 is placed into a charging circuit including a shunt regulating circuit generally indicated by reference numeral 16. The shunt regulating circuit 16 consists of a transistor 18, one or more diodes, there being two diodes shown in FIGURE 1 at 20, 22 and resistors 24 and 26. Since the diodes 20, 22 are to provide a continuous regulation of the charging current throughout the charge period, the diodes are chosen to have a threshold voltage such that they will conduct current at the lowest voltage level applied across the shunt regulating circuit, i.e. the fully discharged voltage of the battery. The transistor 18 which is illustrated as being of the p-n-p type is connected at its emitter 28 to the positive terminal of the battery 14 and to the junction point designated by the numeral 34. The collector 30 of the transistor 18 is connected to the negative terminal of the battery 14, to one end of the resistor 26, and to the center point of the secondary winding of the transformer 10. The base 32, the diodes 20, 22 and the selector arm 36 provide a series circuit for the base current of the transistor. The resistors 24 and 26 are connected directly across the battery 14. A voltage attenuating-current limiting resistor 38 is provided in series with the rectifier 12 and the battery to be charged 14.

In the operation of the circuit of FIGURE 1, the charging current, limited by the resistor 38, is fed directly from the rectifying circuit 12 to the battery under charge 14. The shunt regulating circuit 16 diverts a very small percentage of charge current during the initial charge period if battery voltage is low. While a small current flows through the resistors 24, 26 and hence through the diodes 20, 22 during the initial charge period, there is little conduction of current through the emitter-collector path of the transistor 18. As the battery is charged up, the voltage at its terminals increases. The voltage drop which appears between the junction 34 and the selector arm 36 of the resistor 24 (hereinafter referred to as the sample voltage) increases in response to the rise in battery voltage. Accompanying the increase in sample voltage is a comparable increase in the control voltage between the terminal of emitter 28 and the base of transistor 32 connected through diodes 20 and 22 to selector arm 36. The increase in voltage across the diodes 20 and 22 results in an increase in current through the diodes. This current, which flows from the base 32, directly controls the quantity of current through emitter-collector path of the transistor 18. Therefore, an increase in diode (base) current increases the emitter-collector current shunting the battery and consequently causes a decrease in the battery charging current. As the battery voltage continues to increase, the charging current to the battery approaches an equilibrium (minimum) value and the current in the shunt regulating branch of the circuit approaches a maximum. Thus, it will be observed that the charging current is gradually decreased or tapered to a minimum value when the battery is fully charged.

It is essential to proper operation of the circuits of the invention that the sample voltage represent a significant portion of the control voltage. This proportion is one of the factors which may be used to control the degree of taper of the charging current. A further factor is the ratio of sample voltage to battery on-charge voltage. The larger the sample voltage relative to battery voltage the more effective a given rise in battery voltage becomes in increasing the control voltage, and thus the conduction of the transistor, providing a "steeper" current taper to the battery. The control voltage may be easily increased by increasing the number of series diodes in the base circuit and moving selector arm 36 further down on resistor 24 increasing resistance between 34 and 36, to compensate for the increased voltage drop across the additional diodes.

In the circuit of FIGURE 2, the battery charger there illustrated is essentially the same as that of FIGURE 1 but is modified by the insertion of resistance means 40 between the junction point 34 and the emitter 28 of the transistor 18.

In operation, the battery charger of FIGURE 2 operates in the same manner as the charger illustrated in FIGURE 1. The addition of resistor 40, however, enables a greater degree of control of the charging current to be accomplished. The voltage drop across resistor 40 is a function of the combined charging current and transistor current. The ohmic value of resistor 40 is relatively low compared to that of resistor 38; hence the reduction in charging current is slight. The sample voltage is similarly slightly affected. The control voltage is significantly reduced, however, because the voltage drop across resistor 40 is subtracted from the sample voltage to give the control voltage, and this voltage drop is a significant percentage of the sample voltage. The resultant effect is to change the degree (in point of time and in state of battery charge) of transistor conduction, and to give a different taper near the end of charge when the current through resistor 40 is decreasing and the voltage drop across it is becoming proportionately less. The circuit of FIGURE 2 therefore offers additional flexibility in adjusting circuit values to meet a specific need.

It will be appreciated that a wide variety of modifications and substitutions may be employed in the battery charger of the invention without departing from the invention as herein described. For example, by merely rearranging the shunt regulating circuit components as illustrated in FIGURE 3, earlier transistor conduction resulting in a less tapered charging current characteristic is accomplished.

As shown in FIGURE 3, the branch of the shunt regulating circuit containing resistors 24 and 26 has been interchanged with the branch containing the transistor 18. The voltage drop across the resistor 40 is, with this construction, added to the sample voltage (36 to 34) thereby increasing the control voltage. This causes transistor 18 to become conductive at an earlier point in the charging cycle, and causes the charging current curve to exhibit a generally reduced slope because the voltage drop across resistor 40 becomes lower in the later stages of the charging cycle.

Although the modified circuits illustrated in the drawing differ somewhat in their characteristics, it should be noted that they all operate in the same manner. It should also be noted that with pulsed unidirectional current such as unfiltered rectified A.C. current, the current limiting voltage attenuating function of resistor 38 could equally well be accomplished by a reactive component inserted therefor. Furthermore, the current limiting voltage attenuating function of resistor 38 could be achieved directly by the circuit voltage source, such as by employing a transformer having high reflected resistance by virtue of design.

As an example of the invention, a battery charger substantially identical to the circuit of FIGURE 2 (with the exception that one diode was used in place of the two diodes illustrated) was employed to charge a three cell alkaline zinc-manganese dioxide secondary battery to an end of charge voltage of about 4.8 volts. The circuit was designed for a maximum charging current of about one ampere and included the following components:

Diode 20 _____ 1N2069, manufactured by Texas Instruments, Inc.
Transistor 18 _____ 2N554, manufactured by Motorola.
Resistance 38 _____ 4 ohm, 10 watt.
Resistance 40 _____ 0.1 ohm, 1 watt.
Resistance 24 _____ 25 ohm, 2 watt.
Resistance 26 _____ 18 ohm, 1 watt.

In the test, the battery charger was operated with transformer secondary voltages of 6.7, 7.3 and 8.0 volts.

This variance represented a line voltage of 110, 120 and 130 volts, respectively. The results of the test are illustrated in the graph of FIGURE 4. Significantly, the on-charge battery voltage at the end of the charge cycle was only slightly affected by the line voltage variation. Furthermore, the curves illustrate that within ordinary limits of line voltage variation the battery charger of the invention will perform within a generally predictable battery voltage-charging current relationship, i.e. that area which is bounded by the two outside curves. Because battery voltage is related to the state of charge, it can be further seen from the graph of FIGURE 4 that a substantial portion of the battery capacity was restored during the early portion of the charge period.

In the circuits of the invention, transistors of either polarity may be employed. Thus, while p-n-p types are shown, n-p-n types may be substituted provided the connections to the battery and diodes are reversed.

From the above, it will be observed that the battery charger of the invention is characterized by the unique operation of the shunt regulating circuit whereby a battery is charged up to a substantially constant voltage level which is achieved despite fluctuations in line voltage. By means of this circuit, the battery under charge is provided with a tapered current thereby causing most of the charge to be restored during the early portion of the charging period. The circuit is further characterized by its simplicity and by the small number and the low cost of the components which are required. Because the battery charger of the invention is not inherently limited to any specific battery system it may be advantageously employed to recharge the batteries in such diverse products as a portable television, flashlight, electronic photoflash, and other devices employing battery systems exhibiting a significant and gradual change in voltage during the charging period.

What is claimed is:

1. A battery charger comprising, in combination, a substantially unidirectional voltage source in series with the battery under charge; voltage attenuating means connected in series with said voltage source and said battery; and a shunt regulating circuit connected across said battery, said shunt regulating circuit comprising a transistor having an emitter, base and collector, said emitter and said collector being connected across the terminals of said battery, resistance means having an adjustable tap connected across the emitter-collector path of said transistor and across said battery, and at least one semiconductor diode connected in series between said adjustable tap and the base of said transistor, said diode being chosen to have a threshold voltage such that it will conduct current at the lowest voltage level applied across said shunt regulating circuit when said battery is in the fully discharged condition.

2. The battery charger of claim 1 wherein second resistance means is connected in series with said resistance means having an adjustable tap, both resistance means being connected across the emitter-collector path of said transistor and across said battery.

3. The battery charger of claim 1 wherein third resistance means is connected between said resistance means having an adjustable tap and said emitter of said transistor and in series with said voltage attenuating means.

References Cited

UNITED STATES PATENTS

| | | | |
|---|---|---|---|
| 3,116,439 | 12/1963 | Riebs | 320—39 X |
| 3,237,078 | 2/1966 | Mallory | 307—100 |
| 3,320,509 | 5/1967 | Guglielmi | 323—81 X |

JOHN F. COUCH, *Primary Examiner.*

STANLEY WEINBERG, *Assistant Examiner.*

U.S. Cl. X.R.

320—39; 323—8